Figures 1, 2:
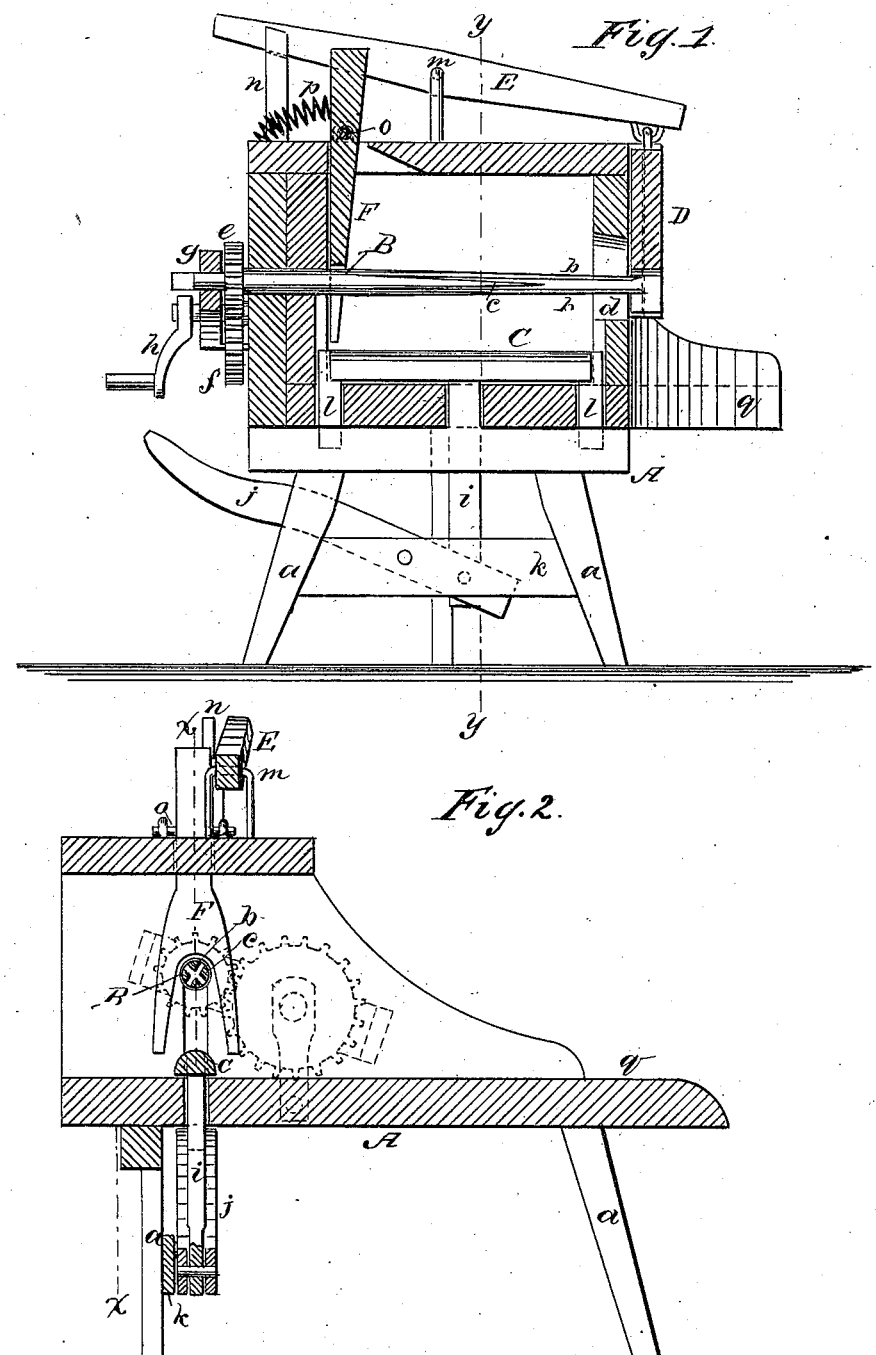

M. E. GETTER.
MACHINE FOR BUNCHING HAY FOR FUEL.

No. 193,942 — Patented Aug. 7, 1877.

WITNESSES:
E. Wolff
J. H. Scarborough

INVENTOR:
M. E. Getter
BY
Munn & Co
ATTORNEYS.

UNITED STATES PATENT OFFICE.

MARCUS E. GETTER, OF ALDEN, MINNESOTA.

IMPROVEMENT IN MACHINES FOR BUNCHING HAY FOR FUEL.

Specification forming part of Letters Patent No. 193,942, dated August 7, 1877; application filed March 19, 1877.

*To all whom it may concern:*

Be it known that I, MARCUS E. GETTER, of Alden, in the county of Freeborn and State of Minnesota, have invented a new and Improved Hay-Bunching Machine, of which the following is a specification:

Figure 1 is a front elevation, in section, on line $x\,x$ in Fig. 2. Fig. 2 is a side elevation, in section, on line $y\,y$ in Fig. 1.

The invention will first be described in connection with the drawings, and then pointed out in the claims.

Referring to the drawings, A is the box or frame of the machine, which is supported upon legs $a$. B is a shaft that is journaled in the side of the box, and is provided with steel tines $b$, which extend horizontally through the box and project through a circular opening, $d$, in the side of the box opposite that in which the shaft B is journaled. Short tines $c$ are placed in alternation with the tines $b$, and both are tapered throughout their entire length, and are polished.

Upon the shaft B, outside the box, a pinion, $e$, is placed, which is driven by a spur-wheel, $f$, whose shaft is journaled in a frame, $g$, attached to the side of the box A. The shaft B extends through the frame $g$, and both it and the shaft of the spur-wheel $f$ are squared, so that a crank, $h$, may be placed on either, as circumstances may require.

A semi-cylindrical presser, C, is placed directly under and parallel to the tines $b\,c$, and is connected by a bar, $i$, with a foot-lever, $j$, which is pivoted to the cross-bar $k$ that connects the legs $a$. The ends of the presser are guided by studs $l$, that extend downward through the bottom of the box.

A slide, D, moving in guides at the side of the box, closes the opening $d$, and it is notched to fit over the ends of the tines, and prevents the hay from escaping at the side of the box.

A lever, E, pivoted at $m$, is connected with the slide D. A stud, $n$, projects upward from the top of the box, and is notched to receive the end of the lever E when it is raised so as to close the slide D.

F is a forked lever, that straddles the shaft B and extends through the top of the box A. It is pivoted at $o$, and is provided with a spring, $p$, that throws it back against the side of the box. The bottom of the box is widened at $q$, forming a platform, from which to feed the machine.

The operation is as follows: Hay is introduced into the box as the tines are revolved, and as it is wound upon the tines the presser is thrown upward by means of the foot-lever $j$. This causes the hay to wind closely upon the tines. When the bunch is sufficiently large the slide D is raised by moving the lever E. The bunch is then discharged from the tines through the opening $d$ by throwing the forked lever F forward.

Having thus described my invention, what I claim as new, and desire to secure by Letters Patent, is—

1. The combination of the slide D, lever E, and box A, substantially as herein shown and described.

2. The combination of the box A, shaft B, having tines $b\,c$, and the forked lever F, substantially as herein shown and described.

MARCUS E. GETTER.

Witnesses:
W. B. RUMSEY,
THEO. FYRER.